United States Patent
Colas et al.

(10) Patent No.: US 6,915,958 B2
(45) Date of Patent: Jul. 12, 2005

(54) LINEAR PROPORTIONAL VALVE

(75) Inventors: Alex Colas, Bolton (CA); Ronald G. Stark, Oakville (CA)

(73) Assignee: Tesma International Inc., Concord (CA)

(*) Notice: Subject to any disclaimer, the term of this patent is extended or adjusted under 35 U.S.C. 154(b) by 0 days.

(21) Appl. No.: 10/443,682

(22) Filed: May 22, 2003

(65) Prior Publication Data

US 2004/0026521 A1 Feb. 12, 2004

Related U.S. Application Data

(60) Provisional application No. 60/382,967, filed on May 22, 2002.

(51) Int. Cl.[7] .................................................. F01P 7/14
(52) U.S. Cl. .................... 236/34.5; 236/84; 236/DIG. 2
(58) Field of Search ........................... 236/34, 34.5, 84, 236/DIG. 2

(56) References Cited

U.S. PATENT DOCUMENTS

| | | | |
|---|---|---|---|
| 4,679,530 A | 7/1987 | Kuze | 123/41.1 |
| 4,726,325 A | 2/1988 | Itakura | |
| 4,848,652 A * | 7/1989 | Kennedy | 236/34.5 |
| 5,111,775 A | 5/1992 | Sumida et al. | |
| 5,979,373 A | 11/1999 | Sano | |
| 6,109,219 A | 8/2000 | Sano | |
| 6,223,700 B1 | 5/2001 | Sano et al. | |
| 6,257,271 B1 | 7/2001 | Babin et al. | |
| 6,314,920 B1 | 11/2001 | Suzuki et al. | |
| 6,315,267 B1 | 11/2001 | Zajac et al. | |
| 6,325,055 B1 | 12/2001 | Yokoyama et al. | |
| 6,343,746 B2 * | 2/2002 | Chamot et al. | 236/34.5 |
| 6,390,031 B1 | 5/2002 | Suzuki et al. | |
| 6,695,217 B2 * | 2/2004 | Leu et al. | 236/34.5 |
| 2001/0020452 A1 | 9/2001 | Suzuki et al. | |
| 2002/0008219 A1 | 1/2002 | Yokoyama et al. | |
| 2003/0136357 A1 | 7/2003 | Kobayashi et al. | 123/41.08 |

* cited by examiner

Primary Examiner—William E. Tapolcai
(74) Attorney, Agent, or Firm—Clark Hill PLC

(57) ABSTRACT

A valve assembly for automatically and proportionally controlling the flow of coolant fluid between an engine and a radiator for cooling the fluid heated by the engine in response to changes in the fluid temperature within a predetermined temperature range. The valve assembly includes a housing having a fluid chamber extending between opposing first and second ends. A radiator port extends between the radiator and the first end of the chamber. A bypass port extends between the engine outlet and the chamber. An engine port extends between the engine inlet and the chamber. A main valve is slidably received within the chamber for movement in and out of engagement with the first end of the chamber for closing and opening fluid flow between the radiator and the chamber. A secondary valve is slidably received within the chamber for movement with the main valve in and out of engagement with the first end of the chamber for opening and closing fluid flow between the bypass port and the chamber. A drive assembly is operatively coupled between the secondary valve and a central control for automatically and proportionally opening and closing the main and secondary valves in response to changes in the fluid temperature within a preselected temperature range.

20 Claims, 7 Drawing Sheets

US 6,915,958 B2

LINEAR PROPORTIONAL VALVE

RELATED APPLICATION

This application claims priority to and all the benefits of U.S. Provisional Patent Application No. 60/382,967, filed on May 22, 2002.

BACKGROUND OF THE INVENTION

1. Field of the Invention

The invention relates to a valve for regulating coolant temperatures of a combustion engine for an automotive vehicle.

2. Description of the Prior Art

Internal combustion engines for automotive vehicles generate heat from the combustion of fuel and friction between the many moving components within the engine, such as between the engine block and the pistons. An engine-driven impeller propels coolant fluid between flow paths formed within the engine block and a heat sink or radiator exposed to ambient airflow passing over the surface of the radiator for carrying the heat away from the engine block. Hoses are typically used to carry coolant fluid between the engine block and the radiator.

Typically, a wax valve or thermostat is coupled between the engine block and the radiator to control the flow of coolant fluid from the engine block to the radiator. Below a predetermined temperature, the thermostat is closed to restrict coolant fluid flow from the engine block to the radiator, which expedites warming of the engine. Above the predetermined temperature, a wax element within the thermostat expands proportionally in response to the rising coolant fluid temperature to mechanically engage and open a valve within the thermostat to allow coolant fluid to flow from the engine block to the radiator. In the radiator, the coolant fluid from the engine is cooled by heat exchange with ambient airflow passing over the surface of the radiator. The cooled coolant fluid passes from the radiator to the engine block and the coolant fluid is again heated by the combustion cycle and friction generated within the engine. The valve is spring biased closed so that within a range of temperatures around the predetermined temperature, the valve opening varies in size roughly in proportion to the coolant fluid temperature. However, wax thermostats are generally slow to respond to engine block temperature and are susceptible to failure due to clogging by contaminates commonly born within the coolant fluid due to corrosion within the engine block and radiator.

It remains desirable to provide a thermostat or valve that can be actively opened and closed to allow or restrict the flow of coolant fluid between the engine block and radiator in response to a wider range of engine variables and states over conventional wax thermostats. Further, it remains desirable to provide a valve that is resistant to the contaminants in the coolant fluid.

SUMMARY OF THE INVENTION

A valve is provided for controlling the flow of coolant between an engine and a radiator in an automotive vehicle. The valve comprises a housing having a chamber formed therein extending between opposing first and second ends. A radiator port extends between the radiator and the first end of the chamber for passing coolant between the radiator and the chamber. A bypass port extends between an outlet from the engine and the chamber for passing coolant flowing between the engine and the chamber. An engine port extends between an inlet from the engine and the chamber for passing coolant flowing from one or both of the radiator or bypass ports between the inlet of the engine and the chamber. A main valve is slidably received within the housing for movement in and out of engagement with the first end of the chamber for closing and opening fluid flow between the radiator and the chamber. A secondary valve is slidably received within the housing for movement with the main valve in and out of engagement with the first end of the chamber for opening and closing fluid flow between the bypass port and the chamber. A drive assembly is operatively coupled between the secondary valve and a central control for automatically and proportionally opening and closing the main and secondary valves in response to changes in the temperature of the coolant within a predetermined temperature range.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
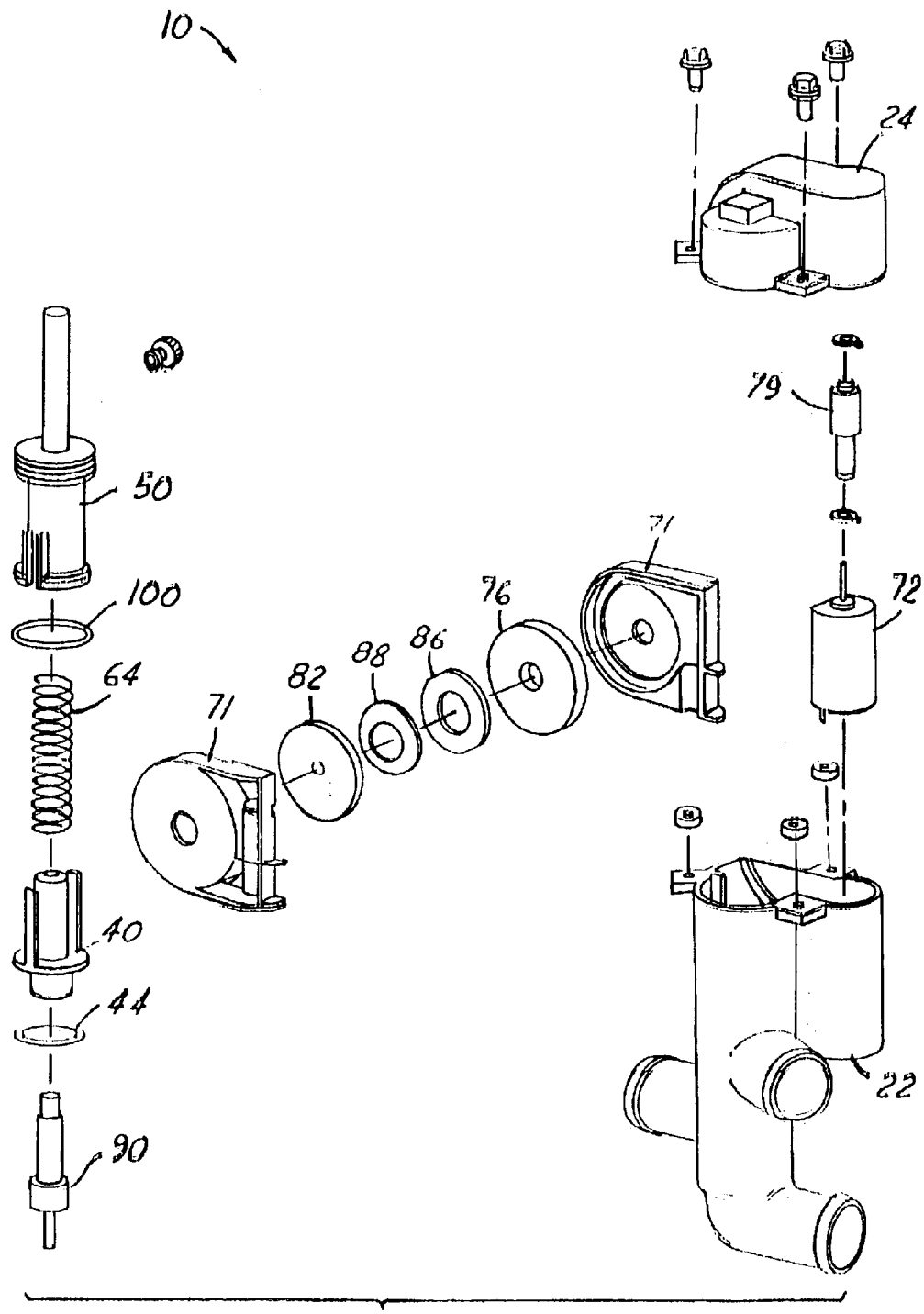
FIG. 1 is an exploded view of a valve assembly according to one aspect of the present invention.

Referring to the Figures, FIGS. 1–6 discloses a valve assembly 10 for controlling the flow of coolant fluid between an engine of an automotive vehicle and a radiator. The valve assembly 10 includes a housing 20 having lower 22 and upper 24 halves for operatively supporting the components of the valve assembly 10. A generally cylindrical chamber 26 is formed between the lower 22 and upper 24 halves and extends between a first end wall 28 in the lower half 22 and a second end wall 30 in the upper half 24. A tubular-shaped inlet or radiator port 32 extends generally outwardly from the first end wall 28 of the chamber 26 for passing fluid flow from the radiator to the chamber 26. A bore 34 is formed in the first end wall 28 for allowing fluid flow between the radiator port 32 and the chamber 26. A tubular-shaped outlet or engine port 36 extends generally outwardly from between the first 28 and second 30 end walls of the chamber 26 for passing fluid flow from the chamber 26 to the engine. A tubular-shaped bypass inlet 38 extends generally outwardly from the chamber 26 between engine port 36 and the second end wall 30 for passing fluid flow from the engine to the chamber 26.

A generally cylindrical main valve 40 is slidably carried within the chamber 26 for axial movement in and out of abutting engagement with the first end wall 28 of the chamber 26. An annular disc or first ring 42 extends radially outwardly from the main valve 40 for axially abutting or seating against the first end wall 28. While seated against the first end wall 28, the first ring 42 prevents fluid flow between the radiator port 32 and the chamber 26. An O-ring gasket 44 is fixedly secured to the first end wall 28 for creating a seal between the first end wall 28 and the first ring 42. The main valve 40 includes a generally conical first guide 46 concentrically engagable with the bore 34 in the first end wall 28 for properly locating the first ring 42 against the first end wall 28 during axial movement of the main valve 40 towards and away from the first end wall 28. Described in greater detail below, the main valve 40 includes a cylindrical second guide 48 extending towards the second end wall 30 of the chamber 26 for maintaining longitudinal alignment of the main valve 40 with the chamber 26 axis.

A generally cylindrical secondary valve 50 is slidably carried within the chamber 26 for axial movement between main valve 40 and the second end wall 30 of the chamber 26. The secondary valve 50 includes a second ring 52 having a slightly smaller diameter than the inner diameter of the chamber 26 for restricting fluid flow between the bypass inlet 38 and the engine port 36. The secondary valve 50 includes a central bore 54 extending through and between the second ring 52 and a bottom 56 for slidably receiving the second guide 48 of the main valve 40 therethrough. A third ring 57 having an annular gasket slot 58 extends radially outwardly from the secondary valve 50 between the bypass inlet 38 and the second end wall 30 of the chamber 26. An O-ring gasket is seated within the gasket slot 58 for creating a seal between the third ring 57 and the walls of the chamber 26 for preventing fluid flow past the third ring 57 in the direction of the second end wall 30 of the chamber 26.

A rack 60 extends axially from the third ring 57 of the secondary valve 50 towards the second end wall 30 of the chamber 26. The rack 60 includes a plurality of teeth 62 formed along a flat side of the rack 60.

Figure 4:
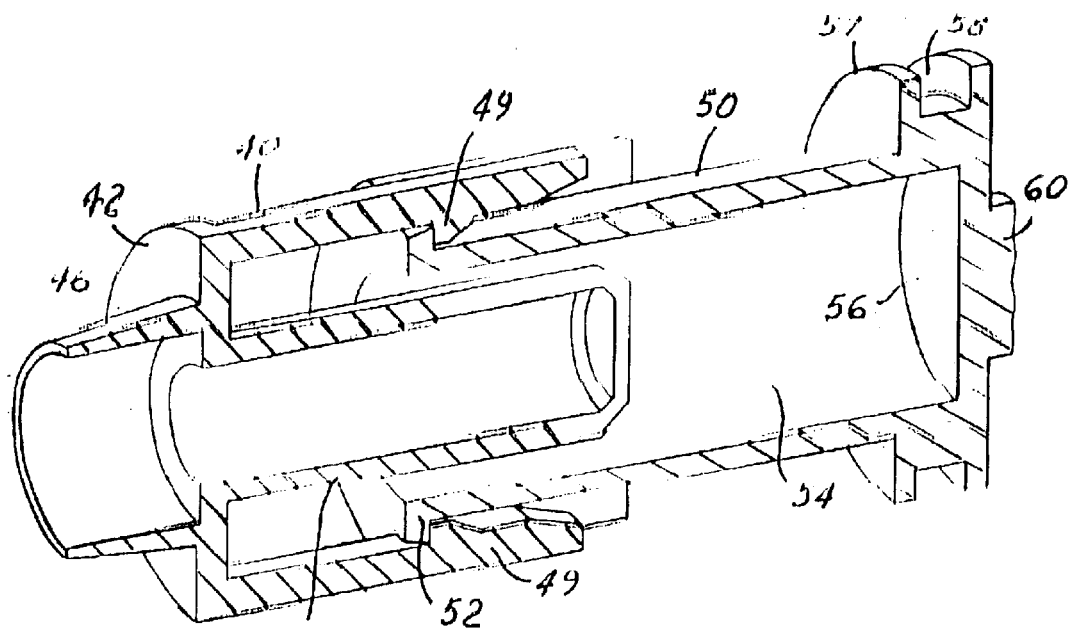
FIG. 4 is a perspective view of a main and secondary valve within the valve assembly.
Figure 5:
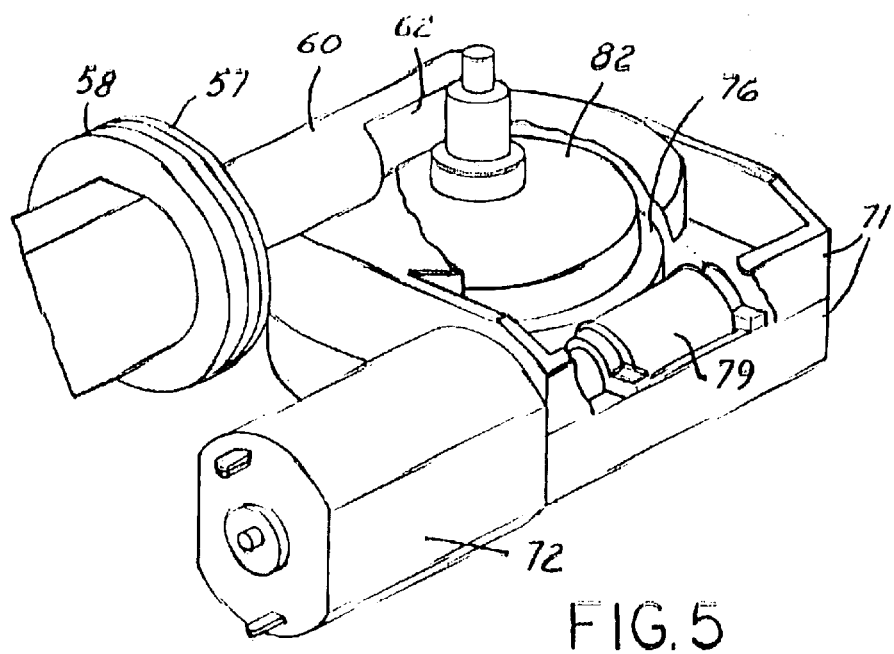
FIG. 5 is a perspective view of a drive assembly within the valve assembly for moving the main and secondary valves between the open and closed positions.

A helical-type spring biasing member 64 is seated along the second guide 48 axis and compressed between the first ring 42 and the bottom 56 of the bore 54 for axially biasing apart the main and secondary valves 40, 50. As best shown in FIG. 4, a pair of lock tabs 49 extends from the first ring 42 of the main valve 40 towards the third ring 57 of the secondary valve 50. The lock tabs 49 are engagable with the second and third rings 52, 57 to limit relative axial movement between the main and secondary valves 40, 50. During normal operation; the biasing member 64 axially biases the lock tabs 49 against the first ring 42 so that the valves 40, 50 move together between the open and closed positions. The main 40 and secondary 50 valves are capable of independent movement as a failsafe provision if the motor fails, as will be discussed in more detail below.

Figure 2:
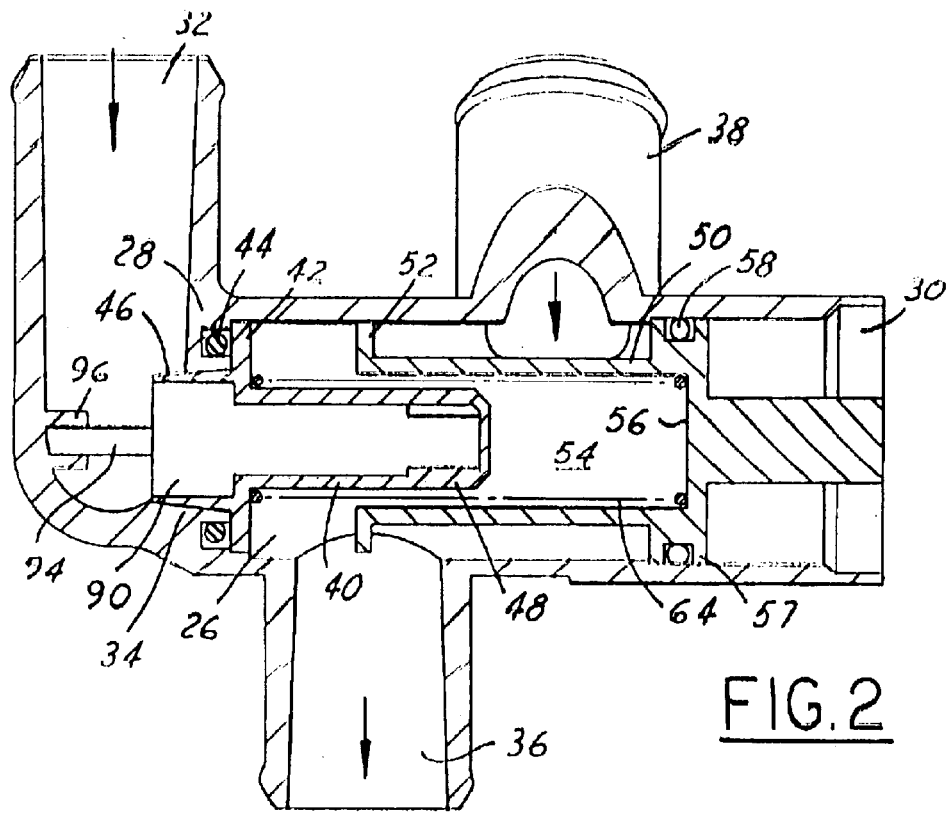
FIG. 2 is a partial cross sectional view of the valve assembly in the closed position.
Figure 3:
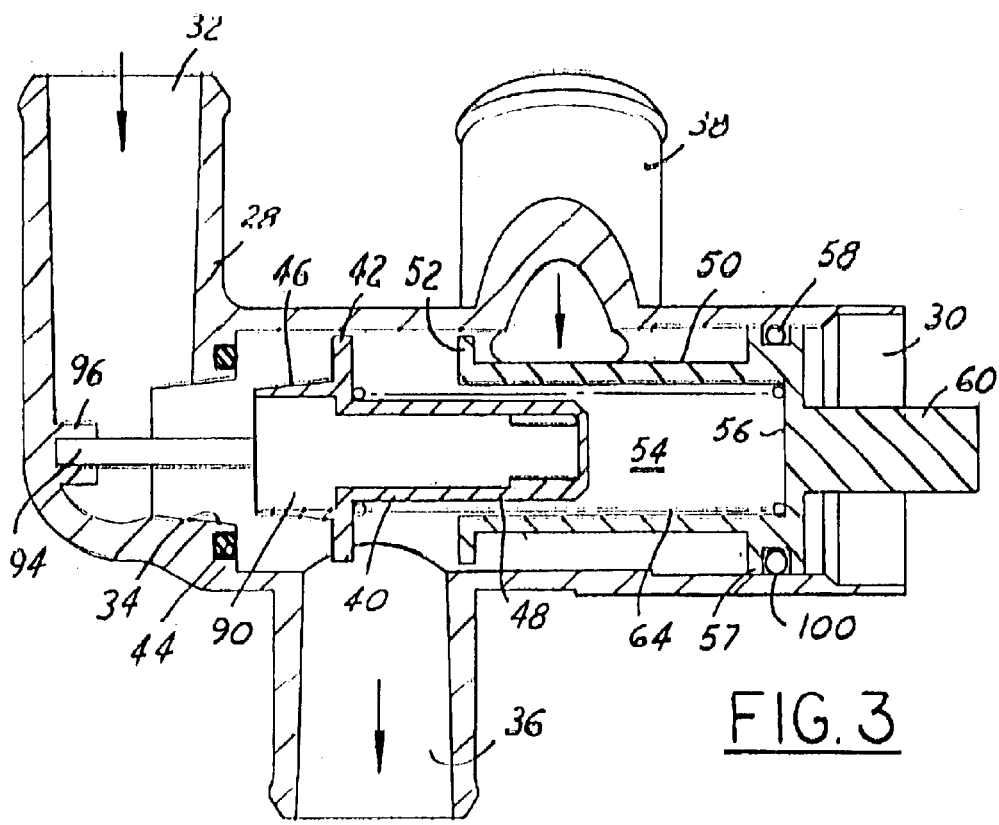
FIG. 3 is a partial cross sectional view of the valve assembly in the open position.
Figure 6:
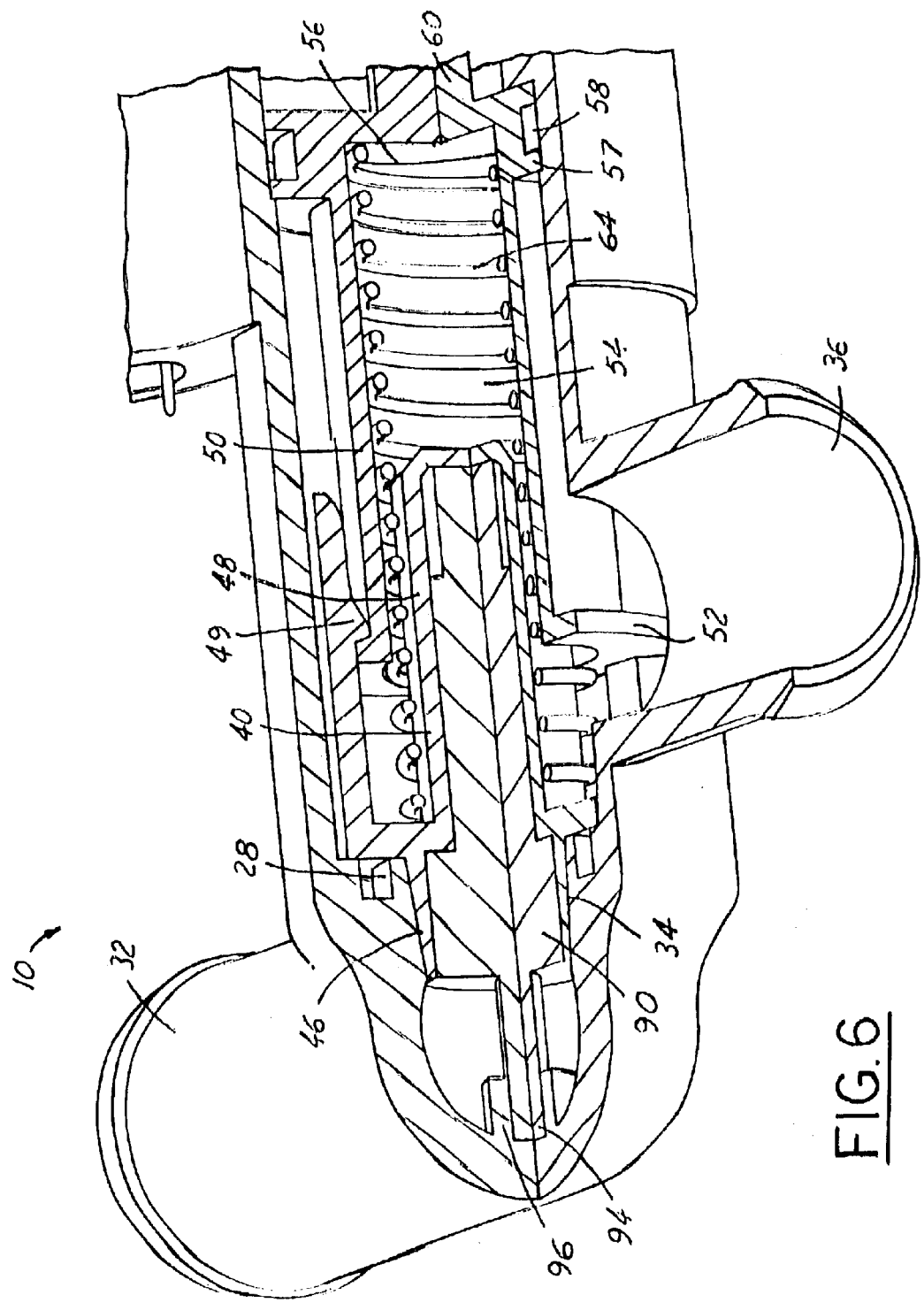
FIG. 6 is a partial perspective view of the valve assembly in the closed position.
Figure 7:
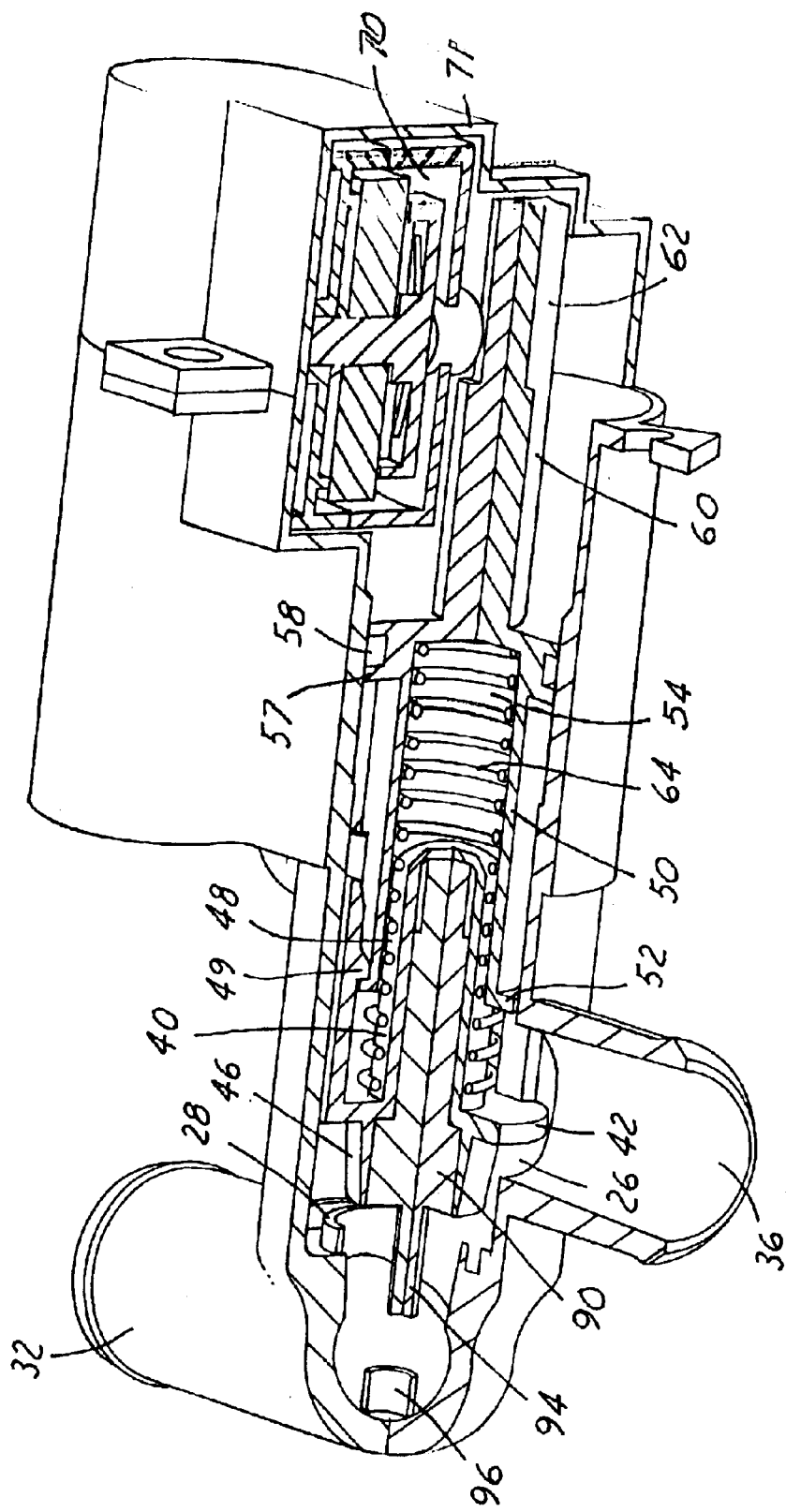
FIG. 7 is a partial perspective view of the valve assembly in the open position.

A drive assembly 70 is supported within the housing for moving the main and secondary valves 40, 50 between the closed position, as shown in FIGS. 2 and 6, and the open position, as shown in FIGS. 3 and 7. More specifically, the drive assembly 70 includes an electric direct current motor 72 for driving a worm 74 and worm gear 76 arrangement carried within a gear housing 71 fixedly secured to the upper half 24 of the housing 20. A pinion 78 is pivotally assembled to the gear housing 71 and operatively coupled to the worm gear 76 for matingly engaging the teeth 62 in the rack 60 and converting the rotational driving output of the motor 72 into linear actuation of the secondary valve 50 between the closed and open positions.

Figure 9:
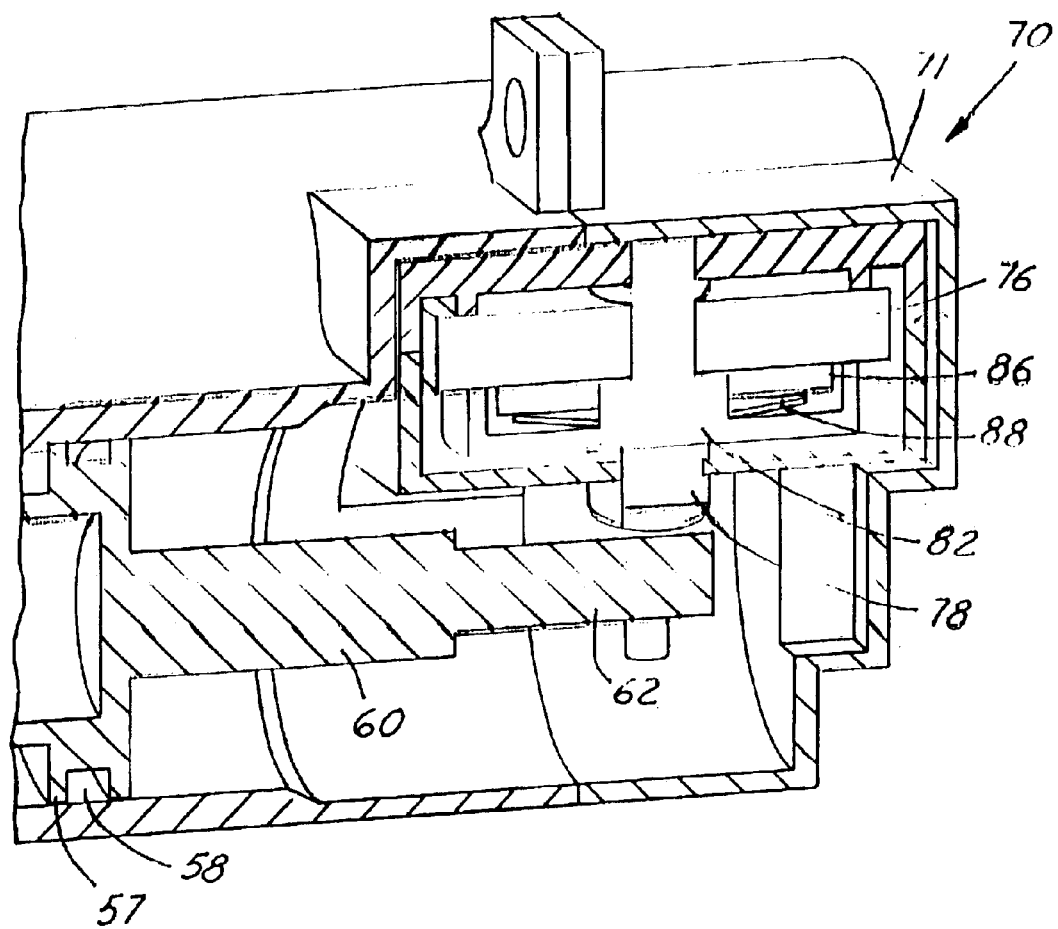
FIG. 9 is a partial perspective view of the drive assembly.

A clutch assembly 80 is operatively coupled between the worm gear 76 and pinion 78 for allowing slip between the motor 72 and secondary valve 50, and thereby, relieving stress between the motor 72 and the valves 40, 50 due to sudden stops of the valves 40, 50 at their axial travel limits. As best shown in FIG. 9, the clutch 80 includes a base 82 fixedly secured to the pinion 78 for pivotal movement therewith. A cylindrical shaft 84 extends axially through the center of the worm gear 76 and is pivotally coupled to the gear housing 71. The shaft 84 and pinion 78 radially locate the base 82 to the gear housing 71. A friction disk 86 and spring disk 88 are seated on the shaft 84 and disposed between the worm gear 76 and base 82. The spring disk 88 is axially compressed between the base 82 and the friction disk 86 for generating an axial compression force between the friction disk 86 and worm gear 76. The friction disk 86 is keyed to the base 82 to prevent relative pivotal movement therebetween for minimizing wear on the spring disk 88.

The position of the valves 40, 50 within the chamber 26 of the housing 20 is monitored by Hall Effect sensors (not shown) embedded within the motor 72. A central control receives and translates the signal output from the sensors in the motor 72 into an axial position of the valves 40, 50 within the chamber 26 based on the predetermined amount of axial travel of the valves 40, 50 for every revolution of the motor 72 windings. Fluid temperature is monitored by temperature sensors (not shown) located in the engine. Signals from the temperature sensors are received by the central control. The central control processes the positional and temperature information to provide the appropriate signal to the drive assembly 70 to open or close the valves 40, 50 accordingly.

In operation, the engine is started which begins the flow of coolant fluid through the engine. Until the engine warms to a predetermined temperature, the central control maintains the valves 40, 50 in the closed position, as shown in FIGS. 2 and 6. In the closed position, the first ring 42 is seated against the gasket 44 to prevent fluid flow through the radiator. This creates a backpressure in the radiator, which prevents flow from the engine through the radiator. The second ring 52 is positioned over or past the engine port, which allows backpressure from the radiator to force fluid to flow through the bypass inlet and chamber 26 and back into the engine. Thus, heat generated within the engine is generally held by the fluid. When the fluid temperature reaches a predetermined level or range, the central control sends a signal to the drive assembly 70 to move the valves 40, 50 to the open position, as shown in FIGS. 3 and 7. More specifically, rotational output from the motor 72 is converted by the worm 74 and worm gear 76 arrangement to axial displacement of the valves 40, 50 to the open position. The pivotal motion of the worm gear 76 is transferred to the pinion 78 by the clutch 80. In the open position, the first ring 42 is spaced apart from the gasket 44 to allow fluid flow from the radiator and through the radiator port 32 and chamber 26, thereby relieving back pressure between the engine and radiator. At the same time, the second ring 52 substantially limits or restricts flow from the engine and through the bypass inlet 38, which creates a back pressure in the fluid between the engine and bypass inlet 38. The back pressure between the engine and bypass inlet 38 forces the fluid to flow through the radiator where the fluid is cooled by heat exchange with ambient air flowing over the radiator. The cooled fluid enters the radiator port 32 and freely passes through the chamber 26 to the engine port 36. Since the gasket 44 axially faces the second end wall 30, the gasket 44 avoids direct fluid flow between the radiator and engine ports. By avoiding direct fluid flow, the gasket 44 is not exposed to abrasive contents such as dirt and debris contained within the cooling fluid thereby extending the service life of the gasket 44. The fluid leaves the engine port 36 and re-enters the engine where the fluid is re-heated by the combustion and friction within the engine. The heated fluid re-emerges from the engine to again be cooled by flow and heat exchange within the radiator. When the fluid temperature is cooled to a predetermined level or range, the central control sends a signal to the drive assembly 72 to move the valves 40, 50 to the closed position, as shown in FIGS. 2 and 6. Within the predetermined temperature range, the position of the valves 40, 50 can be controllably varied by the central control between the open and closed positions in linear proportion to the temperature of the fluid. It should be appreciated that the central control can be adapted to open and close the valves 40, 50 in response to any preselected arrangement and type of sensors, such as sensors for fluid pressure or engine speed.

Figure 8:
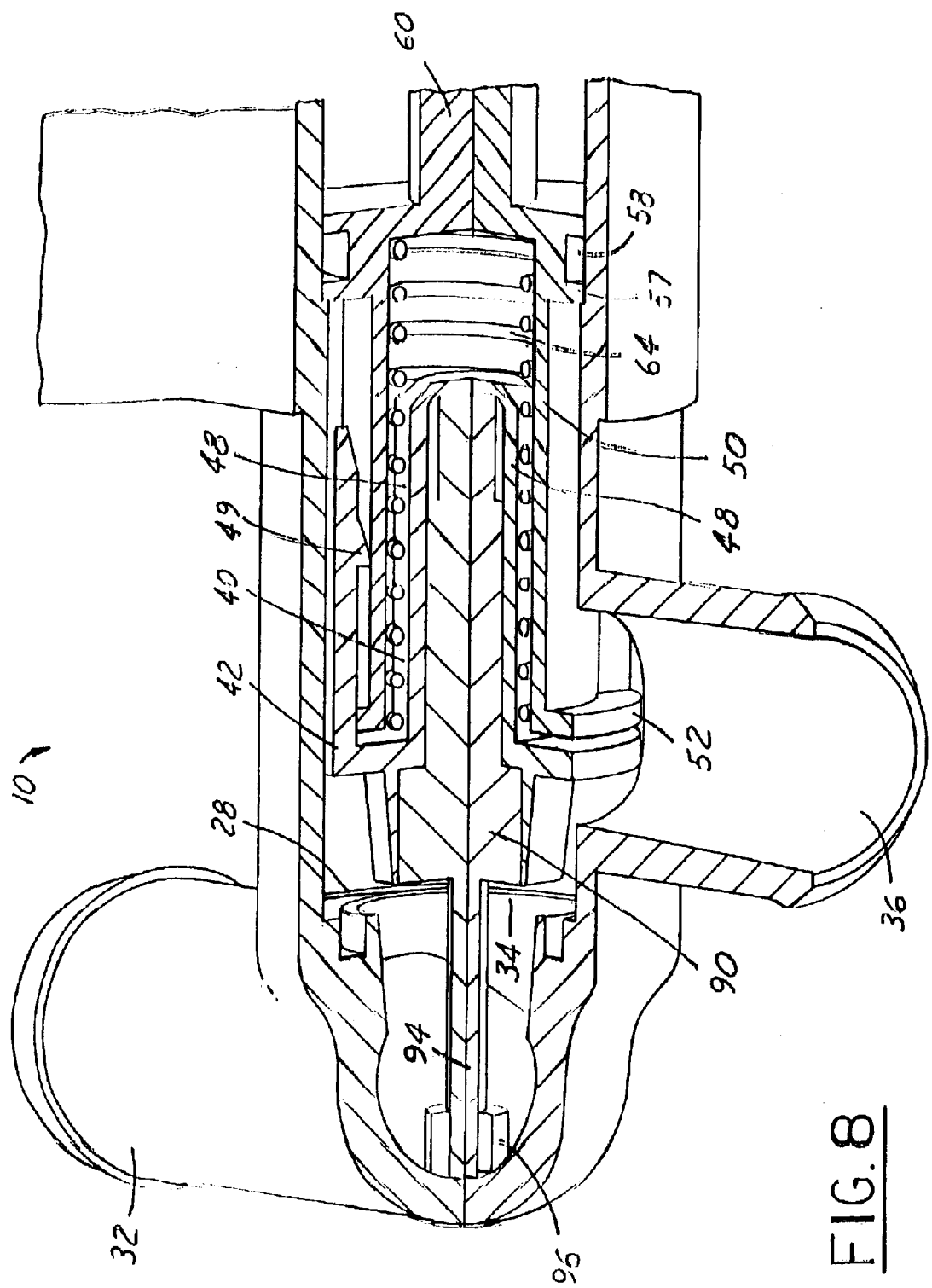
FIG. 8 is a partial perspective view of the valve assembly in an failsafe open position.

A failsafe for the drive assembly 70 or the central control loop in the form of a mechanical wax motor 90 extends between one end 92 fixedly secured within a bore in the first guide 46 and an opposite end 94 slidably engaged with a short, cylindrical locator 96 formed in a portion of the radiator port 32 walls when the valves 40, 50 are in the closed position. During normal functioning of the drive assembly 70, the wax motor 90 moves with the valves 40, 50 between the closed and open positions, as shown in FIGS. 6 and 7, respectively. However, if either the drive assembly 70 or the central control fails while the valves 40, 50 are in the closed position, rising or falling temperature of the fluid will cause the wax motor 90 to expand or contract, respectively. Expansion or contraction of the wax motor 90 displaces the main valve 40 between the open position, as shown in FIG. 8, and the closed position, as shown in FIG. 6 against the bias of the biasing member 64. The secondary valve 50 is held in the closed position by engagement between the teeth 62 in the rack 60 and the failed drive assembly 70, as shown in FIG. 6.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A valve for controlling the flow of coolant between an engine and a radiator in an automotive vehicle, the valve comprising:
    a housing having a chamber formed therein extending between opposing first and second ends;
    a radiator port extending between the radiator and the first end of the chamber for passing coolant flowing between the radiator and the chamber;
    a bypass port extending between an outlet from the engine and the chamber for passing coolant flowing between the engine and the chamber;
    an engine port extending between an inlet from the engine and the chamber for passing coolant flowing from one or both of the radiator and bypass ports between the inlet of the engine and the chamber;
    a main valve slidably received within the housing for movement in and out of engagement with the first end of the chamber for closing or opening fluid flow between the radiator and the chamber, the main valve comprising a cylindrical body including a first ring radially extending from the cylindrical body for engaging the first end of the chamber and a second guide extending longitudinally from the first ring in a direction of the second end of the chamber for maintaining alignment of the main valve within the chamber;
    a secondary valve slidably received within the housing for movement with the main valve in and out of engagement with the second end of the chamber for opening or closing fluid flow between the bypass port and the chamber; and
    a drive assembly operatively coupled between the secondary valve and a central control for automatically and proportionally opening and closing the main and secondary valves in response to changes in the temperature of the coolant within a predetermined temperature range.

2. The valve of claim 1 wherein the main valve includes a conical first guide positioned on an end of the cylindrical body corresponding to a position of the first end, the first guide concentrically engaging a bore for allowing fluid flow between the radiator port and the chamber.

3. The valve of claim 2 wherein the secondary valve comprises a cylindrical member having a second ring extending axially from the cylindrical member and a third ring axially extending from the cylindrical member longitudinally spaced from the second ring.

4. The valve of claim 3 wherein the secondary valve includes a central bore extending from the second ring to the third ring and terminating at a bottom surface.

5. The valve of claim 4 including a spring disposed the central bore, a first end of the spring engaging the bottom surface and a second end of the spring engaging the first ring of the main valve member for maintaining unified movement of the main and secondary valves.

6. The valve of claim 5 wherein the third ring includes an annular gasket slot for receiving an o-ring to prevent cooling fluid from passing the third ring in a direction of the second end of the chamber.

7. The valve of claim 6 wherein the secondary valve includes a rack having teeth formed thereon, the rack extending from the third ring for engaging the drive assembly.

8. A valve for controlling the flow of coolant between an engine and a radiator in an automotive vehicle, the valve comprising:
    a housing having a chamber formed therein extending between opposing first and second ends;
    a radiator port extending between the radiator and the first end of the chamber for passing coolant flowing between the radiator and the chamber;
    a bypass port extending between an outlet from the engine and the chamber for passing coolant flowing between the engine and the chamber;
    an engine port extending between an inlet from the engine and the chamber for passing coolant flowing from one or both of the radiator and bypass ports between the inlet of the engine and the chamber;
    a main valve slidably received within the housing for movement in and out of engagement with the first end of the chamber for closing or opening fluid flow between the radiator and the chamber;
    a secondary valve slidably received within the housing for movement with the main valve in and out of engagement with the second end of the chamber for opening or closing fluid flow between the bypass port and the chamber;

a drive assembly operatively coupled between the secondary valve and a central control for automatically and proportionally opening and closing the main and secondary valves in resoonse to changes in the temperature of the coolant within a predetermined temperature range; and a wax motor disposed between the radiator port and the main valve for providing a failsafe mechanism if the drive assembly can not move the secondary valve, the wax motor extending from a locator formed in the radiator port to a bore formed in a conical first guide of the main valve.

9. A valve for controlling the flow of coolant between an engine and a radiator in an automotive vehicle, the valve comprising:

a housing having a chamber formed therein extending between opposing first and second ends;

a radiator port extending between the radiator and the first end of the chamber for passing coolant flowing between the radiator and the chamber;

a bypass port extending between an outlet from the engine and the chamber for passing coolant flowing between the engine and the chamber;

an engine port extending between an inlet from the engine and the chamber for passing coolant flowing from one or both of the radiator and bypass ports between the inlet of the engine and the chamber;

a main valve slidably received within the housing for movement in and out of engagement with the first end of the chamber for closing or opening fluid flow between the radiator and the chamber;

a secondary valve slidably received within the housing for movement with the main valve in and out of engagement with the second end of the chamber for opening or closing fluid flow between the bypass port and the chamber;

a drive assembly operatively coupled between the secondary valve and a central control for automatically and proportionally opening and closing the main and secondary valves in response to changes in the temperature of the coolant within a predetermined temperature range, wherein the drive assembly comprises an electric motor coupled to a worm mechanism connected to a rack of the secondary valve.

10. The valve of claim 9 wherein the first end wall includes a gasket secured to the first end wall for engaging a first ring of the main valve.

11. The valve of claim 10 wherein the gasket faces towards the second end wall avoiding direct fluid flow between the radiator and engine ports.

12. A valve for controlling the flow of coolant between an engine and a radiator in an automotive vehicle, the valve comprising:

a housing having a chamber formed therein extending between opposing first and second ends;

a radiator port extending between the radiator and the first end of the chamber for passing coolant flowing between the radiator and the chamber;

a bypass port extending between an outlet from the engine and the chamber for passing coolant flowing between the engine and the chamber;

an engine port extending between an inlet from the engine and the chamber for passing coolant flowing from one or both of the radiator and bypass ports between the inlet of the engine and the chamber;

a main valve slidably received within the housing for movement in and out of engagement with the first end of the chamber for closing or opening fluid flow between the radiator and the chamber, the main valve comprises a cylindrical body including a first ring radially extending from the cylindrical body for engaging the first end of the chamber and a second guide extending longitudinally from the first ring in a direction of the second end of the chamber for maintaining alignment of the main valve within the chamber;

a secondary valve slidably received within the housing for movement with the main valve in and out of engagement with the second end of the chamber for opening or closing fluid flow between the bypass port and the chamber;

a wax motor disposed between the radiator port and the main valve, the wax motor moving with the main valve during normal operation of the valve wherein a drive assembly operatively coupled between the secondary valve and a central control automatically and proportionally opens and closes the main and secondary valves in response to changes in the temperature of the coolant;

the wax motor expanding if the drive assembly fails to open and close the main and secondary valves whereby transfer of coolant between the radiator and engine is facilitated.

13. The valve of claim 12 wherein the main valve includes a conical first guide positioned on an end of the cylindrical body corresponding to a position of the first end, the first guide concentrically engaging a bore for allowing fluid flow between the radiator port and the chamber.

14. The valve of claim 12 wherein the secondary valve comprises a cylindrical member having a second ring extending axially from the cylindrical member and a third ring axially extending from the cylindrical member longitudinally spaced from the second ring.

15. The valve of claim 14 wherein the secondary valve includes a central bore extending from the second ring to the third ring and terminating at a bottom surface.

16. The valve of claim 15 including a spring disposed the central bore, a first end of the spring engaging the bottom surface and a second end of the spring engaging the first ring of the main valve member for maintaining unified movement of the main and secondary valves.

17. The valve of claim 14 wherein the third ring includes an annular gasket slot for receiving an o-ring to prevent cooling fluid from passing the third ring in a direction of the second end of the chamber.

18. The valve of claim 14 wherein the secondary valve includes a rack having teeth formed thereon, the rack extending from the third ring for engaging the drive assembly.

19. The valve of claim 12 wherein the first end wall includes a gasket secured to the first end wall for engaging a first ring of the main valve.

20. The valve of claim 19 wherein the gasket faces towards the second end wall avoiding direct fluid flow between the radiator and engine ports.

* * * * *